United States Patent
Bode et al.

(10) Patent No.: US 11,267,356 B2
(45) Date of Patent: Mar. 8, 2022

(54) CHARGING STATION FOR CHARGING ELECTRIC VEHICLES WITH DISTRIBUTED ENERGY MEASUREMENT AND METHOD

(71) Applicant: SIEMENS AKTIENGESELLSCHAFT, Munich (DE)

(72) Inventors: Sebastian Bode, Ahlen (DE); Jörg Heuer, Oberhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 20 days.

(21) Appl. No.: 16/967,215

(22) PCT Filed: Feb. 1, 2019

(86) PCT No.: PCT/EP2019/052481
§ 371 (c)(1),
(2) Date: Aug. 4, 2020

(87) PCT Pub. No.: WO2019/158375
PCT Pub. Date: Aug. 22, 2019

(65) Prior Publication Data
US 2020/0369170 A1 Nov. 26, 2020

(30) Foreign Application Priority Data
Feb. 14, 2018 (DE) .......................... 102018202259.3

(51) Int. Cl.
*B60L 53/31* (2019.01)
*B60L 53/62* (2019.01)
(Continued)

(52) U.S. Cl.
CPC .............. *B60L 53/31* (2019.02); *B60L 53/62* (2019.02); *B60L 53/65* (2019.02); *B60L 58/12* (2019.02);
(Continued)

(58) Field of Classification Search
CPC .......... B60L 53/31; B60L 53/62; B60L 53/65; B60L 58/12; B60L 53/11; B60L 53/30;
(Continued)

(56) References Cited

U.S. PATENT DOCUMENTS

2004/0130292 A1 7/2004 Buchanan
2004/0189251 A1 9/2004 Kutkut
(Continued)

FOREIGN PATENT DOCUMENTS

DE 102009034887 A1 2/2011
DE 102011079430 A1 1/2013
(Continued)

OTHER PUBLICATIONS

German Office Action for German Application No. 10 2018 202 259.3 dated Nov. 6, 2018.
(Continued)

*Primary Examiner* — Paul Dinh
(74) *Attorney, Agent, or Firm* — Lempia Summerfield Katz LLC

(57) ABSTRACT

The present disclosure relates to a charging station for charging electric vehicles. The charging station includes: at least two charging points, which are each connectable to an electric vehicle for charging an electric energy store of the electric vehicle; at least two rectifier branches for providing electrical energy, the rectifier branches being electrically connectable to the charging points and the electrical connection being switchable between at least one of the rectifier branches and the charging points; at least one energy meter
(Continued)

for providing meter values which describe the electrical energy provided by the rectifier branches; and at least one meter value acquisition computer configured to determine, for each of the charging points, the amount of the electrical energy provided by the rectifier branches electrically connected to the charging point based on the meter values of the at least one energy meter.

16 Claims, 5 Drawing Sheets

(51) Int. Cl.
    *B60L 58/12*     (2019.01)
    *B60L 53/65*     (2019.01)
    *H02J 7/00*     (2006.01)
    *H02J 7/04*     (2006.01)

(52) U.S. Cl.
    CPC ........ *H02J 7/00032* (2020.01); *H02J 7/0047* (2013.01); *H02J 7/04* (2013.01); *H02J 2207/20* (2020.01)

(58) Field of Classification Search
    CPC .... B60L 53/665; B60L 53/00; H02J 7/00032; H02J 7/0047; H02J 7/04; H02J 2207/20; H02J 2310/48; H02J 7/0013; H02J 7/02; H02J 1/06; Y02T 10/70; Y02T 10/7072; Y02T 90/12; Y02T 90/14; Y02T 90/16; Y02T 90/167; Y02T 90/169; Y04S 30/14
    USPC ......................................................... 320/109
    See application file for complete search history.

(56) References Cited

U.S. PATENT DOCUMENTS

| | | | |
|---|---|---|---|
| 2011/0279083 A1* | 11/2011 | Asai | ........................ B60L 53/11 320/109 |
| 2012/0140371 A1 | 6/2012 | Gaul | |
| 2013/0015809 A1 | 1/2013 | Frey | |
| 2013/0057210 A1 | 3/2013 | Nergaard | |
| 2013/0278214 A1* | 10/2013 | Satoh | ...................... B60L 53/31 320/109 |

FOREIGN PATENT DOCUMENTS

| | | |
|---|---|---|
| DE | 102015012360 A1 | 4/2016 |
| DE | 102016223715 A1 | 5/2018 |
| EP | 2371611 B1 | 5/2012 |
| EP | 2751902 A1 | 7/2014 |
| WO | WO2013032519 A1 | 3/2013 |
| WO | WO2013100764 A1 | 7/2013 |

OTHER PUBLICATIONS

International Preliminary Report on Patentability for International Patent Application PCT/EP2019/052481 dated Feb. 14, 2020.
PCT International Search Report and Written Opinion of International Searching Authority dated Apr. 29, 2019 corresponding to PCT International Application No. PCT/EP2019/052481 filed Feb. 1, 2019.

* cited by examiner

CHARGING STATION FOR CHARGING ELECTRIC VEHICLES WITH DISTRIBUTED ENERGY MEASUREMENT AND METHOD

The present patent document is a § 371 nationalization of PCT Application Serial No. PCT/EP2019/052481, filed Feb. 1, 2019, designating the United States, which is hereby incorporated by reference, and this patent document also claims the benefit of German Patent Application No. 10 2018 202 259.3, filed Feb. 14, 2018, which is also hereby incorporated by reference.

TECHNICAL FIELD

The present disclosure relates to a charging station for charging electric vehicles, including at least two charging points which may each be connected to an electric vehicle for the purpose of charging an electrical energy store of the electric vehicle. The charging station also includes at least two rectifier branches for respectively providing electrical energy, wherein the rectifier branches may be electrically connected to the charging points and the electrical connection may be changed over between at least one of the rectifier branches and the charging points. The charging station also includes at least one energy meter for providing meter values which describe the electrical energy provided with the rectifier branches. The present disclosure also relates to a method for operating a charging station for charging electric vehicles.

BACKGROUND

In the present case, interest focuses on charging stations for charging electric vehicles and, in particular, so-called quick charging stations. In the field of quick charging stations for electric vehicles, it is conventional practice to design them in such a manner that there is one central station and a plurality of possibly remote charging points. The electric vehicles may be connected to these charging points in order to charge an electrical energy store of the electric vehicle. In this example, the individual components in the central station are not necessarily assigned to a particular charging point, but rather are dynamically assigned to the charging points, if possible. In the field of power electronics in particular, the utilization of expensive components may thus be increased, and the required number of identical components may be reduced (e.g., utilization of the simultaneity factor). In the case of very high maximum load currents or charging powers, in particular, the dynamic response caused by the vehicle is particularly strong over time.

Maximum charging currents may be achieved only for relatively short periods owing to the properties of the energy stores or rechargeable batteries installed in the electric vehicles. It should also be noted that there is a relatively wide variety of electric vehicles and their charging profiles which cannot be readily divided into defined classes. Finally, the maximum charging current also depends, inter alia, on parameters such as the battery temperature which cannot be assumed to be constant.

The charging stations or quick charging stations include corresponding rectifier branches which may be used to convert an input-side AC voltage or an alternating current into an output-side DC voltage or a direct current. An output-side DC measurement of the output electrical energy inevitably results in the measuring devices also having to be designed for the entire dynamic range. In this case, not only is the current highly dynamic, but the output-side voltage is also variable. This is due to power losses and different battery voltages. In this case, the consideration of the error propagation of two variables multiplied by one another has a particularly unfortunate effect. There are also further complications in the measurement, for example, caused by ripple currents.

An alternative to the output-side measurement is the input-side AC measurement. At least the voltage is less variable on the input side. The dynamic range of the current may then be limited by using a plurality of meters and dividing the meters among the rectifier branches. For example, each rectifier branch may have its own meter. If n rectifier branches are needed to provide the full nominal output power, each meter is configured only for the nth part of the dynamic range.

The charging station may include appropriate energy meters which are used to provide meter values which describe the electrical energy output with the rectifier branches. Because the meter values captured by the energy meters are relevant to billing, an assignment to a customer or an electric vehicle is possible. However, this requirement proves to be technically difficult for several reasons. On the one hand, it is the case that the customers at the charging points regularly change. Therefore, a unique assignment between a charging operation and a customer or an electric vehicle is provided. On the other hand, this assignment is likewise uniquely provided if dynamic energy meters are assigned to a charging operation. In particular, it is provided that the assignment is withdrawn if energy is removed for purposes other than for the specific charging operation. Furthermore, the dynamic connection of further branches increases the system losses, whereas disconnection reduces the system losses. Such losses are configured to be taken into account in order to comply with tolerances when determining the overall result.

In previous applications, measuring devices for obtaining electrical energy may be used in such a manner that (multi-) annual consumptions of entire households are determined, wherein random errors of successive measurement periods are compensated for over time (e.g., for the same customer). In contrast, in the case of the relatively short durations of a charging operation in electromobility, only small amounts of output energy therefore result even in the case of rather large powers. If a rectifier branch were used only for a very short peak load of sometimes less than a minute, in particular, this would result in corresponding distortion of the measurement result on account of the resolution of the energy meter.

The quick charging infrastructure is currently only constructed in higher power classes. Previous approaches to capturing energy met only reduced requirements with regard to the manipulation security and comprehensibility of the measurement. However, it may be expected that higher requirements will be required within the scope of the conformity assessments of the quick charging infrastructure and legal transitional periods will not be extended.

SUMMARY AND DESCRIPTION

Therefore, the object of the present disclosure is to show a solution of how the electrical energy output at the respective charging points may be determined in a more reliable manner in the case of a charging station of the type mentioned at the outset.

This object is achieved by a charging station and a method disclosed herein. The scope of the present disclosure is defined solely by the appended claims and is not affected to any degree by the statements within this summary. The present embodiments may obviate one or more of the drawbacks or limitations in the related art.

A charging station is used to charge electric vehicles. The charging station includes at least two charging points which may each be connected to an electric vehicle for the purpose of charging an electrical energy store of the electric vehicle. The charging station also includes at least two rectifier branches for respectively providing electrical energy, wherein the rectifier branches may be electrically connected to the charging points and the electrical connection may be changed over between at least one of the rectifier branches and the charging points. The charging station also includes at least one energy meter for providing meter values which describe the electrical energy provided with the rectifier branches. The charging station also includes at least one measured value capture computer which is designed to determine, for each of the charging points, an amount of energy of the electrical energy provided with the rectifier branches, which are electrically connected to the charging point, on the basis of the meter values from the at least one energy meter.

The charging station includes the at least two charging points at which electric vehicles may be charged. In the present disclosure, the term "electric vehicle" may refer to an electrically driven vehicle. Such an electric vehicle includes an electrical drive or an electric motor which is supplied with electrical energy from the electrical energy store. The electrical energy store is a battery or a rechargeable battery. Appropriate sockets and/or connectors may be provided at the respective charging points in order to be able to establish an electrical connection to a charging connection of the electric vehicle. The charging station also includes at least two rectifier branches which are connected to a power supply network on the input side. The respective rectifier branches may be used to convert an AC voltage and/or an alternating current into a DC voltage and/or a direct current for charging electric vehicles. In one example, one rectifier may be provided in the respective rectifier branches. Provision may also be made for a corresponding DC/DC converter to be connected downstream of this rectifier. It is therefore possible for the electric vehicles to be charged at the respective charging points with a direct current. The charging station is therefore in the form of a so-called quick charging station.

In one example, the charging station includes two charging points and two rectifier branches. In this example, provision is made for at least one of the rectifier branches to be able to be electrically connected either to the first charging point or to the second charging point. Depending on the load requirement at the respective charging points, it is therefore possible, for example, to change over the rectifier branches to the respective charging points. In principle, the charging station may have a plurality of rectifier branches and a plurality of charging points. In this example, at least some of the rectifier branches may be arbitrarily electrically connected to predetermined ones of the charging points. The charging station also includes at least one energy meter which may be used to determine the electrical energy provided with the rectifier branches. The energy meter may be a measuring device which may be calibrated or is calibrated. In certain examples, the charging station may have a plurality of energy meters. In particular, one energy meter is assigned to each of the rectifier branches.

An important aspect of the present disclosure provides for the charging station to have the at least one measured value capture computer. This measured value capture computer, which has a corresponding computing device or a microcontroller, in particular, is connected to the at least one energy meter for the purpose of transmitting data. The meter values may therefore be transmitted from the energy meter to the measured value capture computer. For each of the charging points, the amount of energy with the rectifier branches connected to this charging point may therefore be determined with the aid of the measured value capture computer. The use of the measured value capture computer makes it possible to couple the changeover of the at least one rectifier branch and the charging points to the capture of the amount of energy. The capture of the amount of energy delivered at the respective charging points is provided by the charging station in a manner that makes it possible to uniquely assign the amount of energy captured by the at least one energy meter to an electric vehicle if the rectifier branches are dynamically assigned. Overall, it is therefore possible to improve the utilization of the charging station and to accordingly reduce the investment costs and the space requirement.

The at least one measured value capture computer is also designed to capture a changeover of the connection between the at least one rectifier branch and the charging points. The measured value capture computer therefore captures the instantaneous meter values from the continuously running energy meter each time the rectifier branches are changed over and assigns them or the differences between successive values to the vehicle identification. The respective rectifier branches may be electrically connected to the charging points or changed over via corresponding switching devices or contactors. In this example, provision is made, in particular, for such a changeover or actuation of the switching device to be detected with the aid of the measured value capture computer. Provision may also be made for a time of the changeover to be stored with the aid of the measured value capture computer. This makes it possible to reliably operate the charging station and therefore to precisely capture the amount of energy at the respective charging point.

The at least one measured value capture computer may be configured to determine a vehicle identification of the electric vehicle during the charging of the electrical energy store of the electric vehicle and to determine the amount of energy provided at the charging point during the charging of the electrical energy store. If the electric vehicle is electrically connected to one of the charging points, a corresponding vehicle identification which describes the electric vehicle may be transmitted to the charging station and therefore to the measured value capture computer. In this example, provision may be made for the measured value capture computer to be used to detect whether and for how long the electrical connection is present between the charging station and the electric vehicle. For the charging point, the amount of energy provided with the rectifier branches connected to the charging point may be determined on the basis of the meter values using the measured value capture computer. The amount of energy transmitted to the electric vehicle or its energy store while the electric vehicle is connected to the charging point may therefore be precisely determined. The capture of the vehicle identification makes it possible to detect when the user or the vehicle at the charging point is changed. It is also possible to detect whether the user of the electric vehicle changes the charging point, e.g., moves the electric vehicle from one charging point to the other and continues the charging operation there. This makes it possible to exclude unnoticed manipulation.

It is also advantageous if the charging station has a charging procedure control unit for determining an electrical power required at the charging points and for controlling the connection between the rectifier branches and the charging points based on the required power. The charging procedure controller or the charging procedure control unit may be used to determine what need there is for electrical power and what amount of output energy this power will result in. In this example, the charging procedure control unit may already consider the possibility of a load distribution between the individual rectifier branches. For example, the charging procedure control may be carried out in such a manner that a basic load is applied to rectifier branches which are used only in the short term to cover a peak load. This results in operation of the rectifier branches at an operating point which may be estimated well and in a uniform distribution of the measured amount of energy with the aid of the at least one energy meter.

In a further configuration, the charging station has an energy meter for each of the rectifier branches, wherein the meter values provided with the respective energy meters describe the electrical energy from the energy meter assigned to the rectifier branch. The respective energy meters may be commercially available measuring devices which may be accordingly calibrated or are calibrated. The energy meters may be used to determine the electrical voltage and the electrical current intensity output by the respective rectifier branches. Provision may also be made for the respective energy meters to be used to determine the electrical voltage and the electrical current intensity supplied to the respective rectifier branch from the power supply network. The electrical energy provided with the rectifier branches may be precisely determined with the aid of the respective energy meters.

In this example, the charging station may have a measured value capture computer for each of the charging points, wherein the measured value capture computers are connected to the respective energy meters via a data bus. Provision is also made for the charging station to have a plurality of switching devices for switching the electrical connection between the respective rectifier branches and charging points and for switching the connection of the data bus. The charging station may have corresponding switching devices or contactors which may be used to provide the respective electrical connection between the rectifier branches and the charging points. The charging station may have electrical connecting lines which may be opened and closed by the switching devices. Provision is also made for the respective energy meters to be connected to the measured value capture computers via the data bus. In this example, the data bus may be routed parallel to the electrical connecting lines which are used to connect the rectifier branches to the charging points. The respective switching devices or contactors may have a corresponding auxiliary contactor for the data bus which is also used to simultaneously switch the data bus when the contactor is actuated. This means that, when the contactor is opened, the data bus is also simultaneously opened or interrupted. Because a measured value capture value is assigned to each of the charging points in the present example, the respective data connection between the energy meter of the rectifier branch and the measured value capture computer assigned to the charging point results automatically when changing over the switching devices. A changeover of the rectifier branches may therefore be detected in a reliable manner. It is also possible for the meter values to be captured in a precise and comprehensible manner.

In a further embodiment, the at least one measured value capture computer is connected to the respective energy meters for the purpose of transmitting data, and the charging station has a plurality of switching devices for switching the electrical connection between the respective rectifier branches and the charging points, wherein the at least one measured value capture computer is designed to capture a respective position of the switching devices. In this embodiment, the charging station may have one measured value capture computer in the simplest case. This measured value capture computer is connected to the energy meters via a corresponding data bus or corresponding data lines and may therefore receive the meter values from said meters. The measured value capture computer may also receive information or switching information which receives a current switching state of the respective switching devices or contactors which are used to switch the electrical connection between the rectifier branches and the charging points. On the basis of this switching information, the measured value capture computer may determine which of the rectifier branches are connected to which of the charging points. On the basis of the respective meter values, the measured value capture computer may then also determine what amount of energy was output by the respective rectifier branches during the switching position of the switching device. The amount of energy output at the respective charging points may therefore also be determined in a reliable manner.

In this example, the at least one measured value capture computer may have an analog interface via which it is connected to the respective energy meters. Provision is also made for the at least one measured value capture computer to have a summing element for summing the meter values. The respective energy meters may be read via an analog interface. An analog signal in the range between 4 mA and 20 mA may be output, for example, using the respective energy meters. Measured values or numerical values may then be added with the aid of the summing element or an analog summing element. In this example, the respective amounts of energy removed at the respective charging points may thus be precisely determined.

According to a further embodiment, the charging station includes a measuring transducer for each of the rectifier branches for the purpose of providing a measured value which describes the electrical energy. Furthermore, an energy meter is assigned to each of the charging points, wherein the measuring transducers are connected to the energy meters on the basis of the connection of the rectifier branches to the charging points, and the respective energy meters are designed to determine the meter values on the basis of the measured values. The measured value may be output in the form of an analog signal with the aid of the respective measuring transducers, wherein the measured value describes the electrical voltage and/or the electrical current output with the respective rectifier branch. In this example, the charging station has a plurality of switching devices which may be used to define the electrical connection between the rectifier branches and the charging points. In this example, switching devices may be provided for the purpose of disconnecting and opening the electrical connection between the respective rectifier branches and the charging points. Furthermore, switching devices may be provided and may be used to provide an electrical connection between the measuring transducers. For example, the switching devices for switching the electrical connection may be in the form of a contactor in the rectifier branch. A positively driven auxiliary contactor may be provided for the purpose of electrically switching the connection between the measuring transducers. If, for example, two rectifier branches are connected to one charging point, provision is made for the measuring transducers of these rectifier branches to also be electrically connected to one another. In this example, the measuring transducers may be configured in such a manner that they may be connected in series. Furthermore, the measuring transducers connected in series are also connected to the energy meter assigned to the charging point. The measured values from both rectifier branches connected to the charging point are therefore supplied to this energy meter. In this manner, the amount of energy respectively removed at the charging points may also be determined in a precise manner.

The exemplary embodiments described above show different variants of how the amount of energy at the respective charging points may be precisely determined. In this example, provision is made for commercially customary components to be used inside the charging station. Additional hardware components are provided for the purpose of determining the amount of energy at the respective charging points. The expansion of the charging station for determining the amount of energy at the charging points in comparison with a software configuration therefore becomes comprehensible.

In one embodiment, the at least one energy meter is configured to capture an electrical voltage and/or an electrical current supplied to the rectifier branch. In certain examples, an AC measurement may be carried out with the aid of the energy meter. The electrical voltage and/or the electrical current supplied to the rectifier branch may therefore be determined with the aid of the energy meter. Alternatively, provision may be made for the at least one energy meter to be designed to capture an electrical voltage and/or an electrical current output by the rectifier branches. Provision may therefore also be made for a so-called DC measurement to be carried out.

A method is used to operate a charging station for charging electric vehicles. The method includes connecting an electric vehicle to one of at least two charging points for charging an electrical energy store of the electric vehicle. The method also includes respectively providing electrical energy with at least two rectifier branches, wherein the rectifier branches may be electrically connected to the charging points and the electrical connection between at least one of the rectifier branches and the charging points may be changed over. The method also includes providing meter values, which describe the electrical energy provided with the rectifier branches, using at least one energy meter. In this example, provision is made, for each of the charging points, for an amount of energy of the electrical energy provided with the rectifier branches electrically connected to the charging point to be determined on the basis of the meter values from the at least one energy meter using at least one measured value capture computer. A changeover of the connection between the at least one rectifier branch and the charging points is also captured using the at least one measured value capture computer, wherein instantaneous meter values from the at least one energy meter are captured using the at least one measured value capture computer each time the at least one rectifier branch is changed over and differences between the meter values are assigned to a vehicle identification of the electric vehicle.

The embodiments and their advantages presented with respect to the charging station accordingly apply to the method.

Further features of the disclosure emerge from the claims, the figures and the description of the figures, and the description of the exemplary embodiments. The features and combinations of features mentioned above in the description and the features and combinations of features mentioned in the description of the figures below and/or shown in the figures alone may be used not only in the respectively stated combination, but also in other combinations, without departing from the scope of the disclosure.

BRIEF DESCRIPTION OF THE DRAWINGS

The disclosure is now explained in more detail based on the exemplary embodiments and with reference to the accompanying drawings, in which.

In the figures, identical or functionally identical elements are provided with the same reference signs.

DETAILED DESCRIPTION

Figure 1:
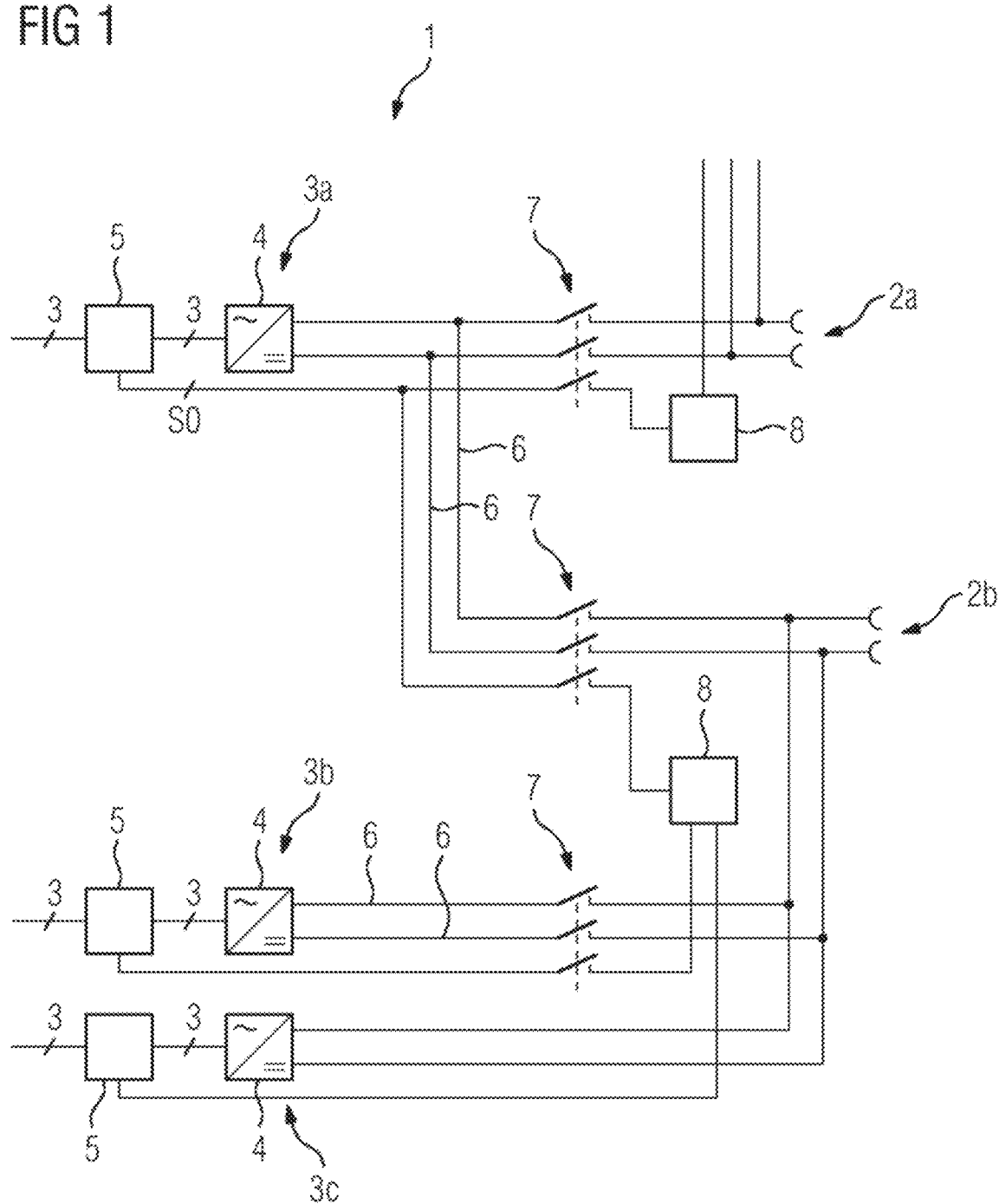
FIG. 1 depicts a schematic illustration of an example of a charging station including two charging points and a plurality of rectifier branches.

FIG. 1 shows a schematic illustration of a charging apparatus 1. The charging apparatus 1 is used to charge electrical energy stores of electric vehicles or electrically driven vehicles. For this purpose, the charging apparatus 1 includes charging points 2a, 2b to which the electric vehicles may be connected. In the present example, the charging station 1 includes a first charging point 2a and a second charging point 2b. Provision may also be made for the charging station 1 to have at least three charging points 2a, 2b. In addition, the charging station 1 includes at least two rectifier branches 3a, 3b, 3c. In the present example, the charging station 1 includes a first rectifier branch 3a, a second rectifier branch 3b, and a third rectifier branch 3c. The respective rectifier branches 3a, 3b, 3c may be used to convert a three-phase AC voltage or an alternating current into a DC voltage or a direct current. The electrical energy stores of the electric vehicles at the respective charging points 2a, 2b may then be charged using this direct current. In the present example, the respective rectifier branches 3a, 3b, 3c each include one rectifier 4.

The charging station 1 also includes at least one energy meter 5. In the present example, the charging station 4 includes each of the rectifier branches 3a, 3b, 3c and an energy meter 5. The electrical energy or the amount of energy supplied to the respective rectifier branch 3a, 3b, 3c from the power supply network may be determined with the aid of the respective energy meter 5. Meter values which describe this amount of energy may also be provided using the respective energy meters 5.

In the case of the charging station 1, provision is made for the electrical connection to be able to be changed over between the charging points 2a, 2b and at least some of the rectifier branches 3a, 3b, 3c. In the present example, the third rectifier branch 3c is permanently connected to the second charging point 2b via electrical connecting lines 6. The second rectifier branch 3b may be additionally connected to the second charging point 2b. For this purpose, the charging station 1 has a corresponding switching device 7 or a contactor which may be used to switch the connection between the second rectifier branch 3b and the second charging point 2b. The first rectifier branch 3a may be connected either to the first charging point 2a or to the second charging point 2b. A corresponding switching device 7 is also provided for this purpose. The switching states of the switching device 7 may be determined depending on the power requirement at the charging points 2a, 2b.

The charging station 1 also includes at least one measured value capture computer 8. In the present example, the charging station 1 includes two measured value capture computers 8, wherein a measured value capture computer 8 is assigned to each of the charging points 2a, 2b. The respective measured value capture computers 8 are connected to the respective energy meters 5 of the rectifier branches 3a, 3b, 3c via a data bus 9, for example an S0 bus. The respective meter values which are determined using the energy meters 5 may therefore be transmitted to the measured value capture computer 8. In the present example, the respective switching devices 7 are designed in such a manner that, in addition to a contactor for switching the electrical connecting lines 8, they have an auxiliary contactor for switching the data bus 9. In this example, the auxiliary contactor is switched at the same time as the contactor. If the rectifier branches 3a, 3b, 3c are now connected to the respective charging points 2a, 2b, the switching devices 7 are accordingly actuated for this purpose. As a result, the energy meter 5 of the rectifier branch 3a, 3b, 3c connected to the charging point 2a, 2b is also connected to the measured value capture computer 8. The amount of energy provided at the respective charging points 2a, 2b may therefore be captured using the respective measured value capture computers 8 at the charging points 2a, 2b on the basis of the received meter values.

Figure 2:
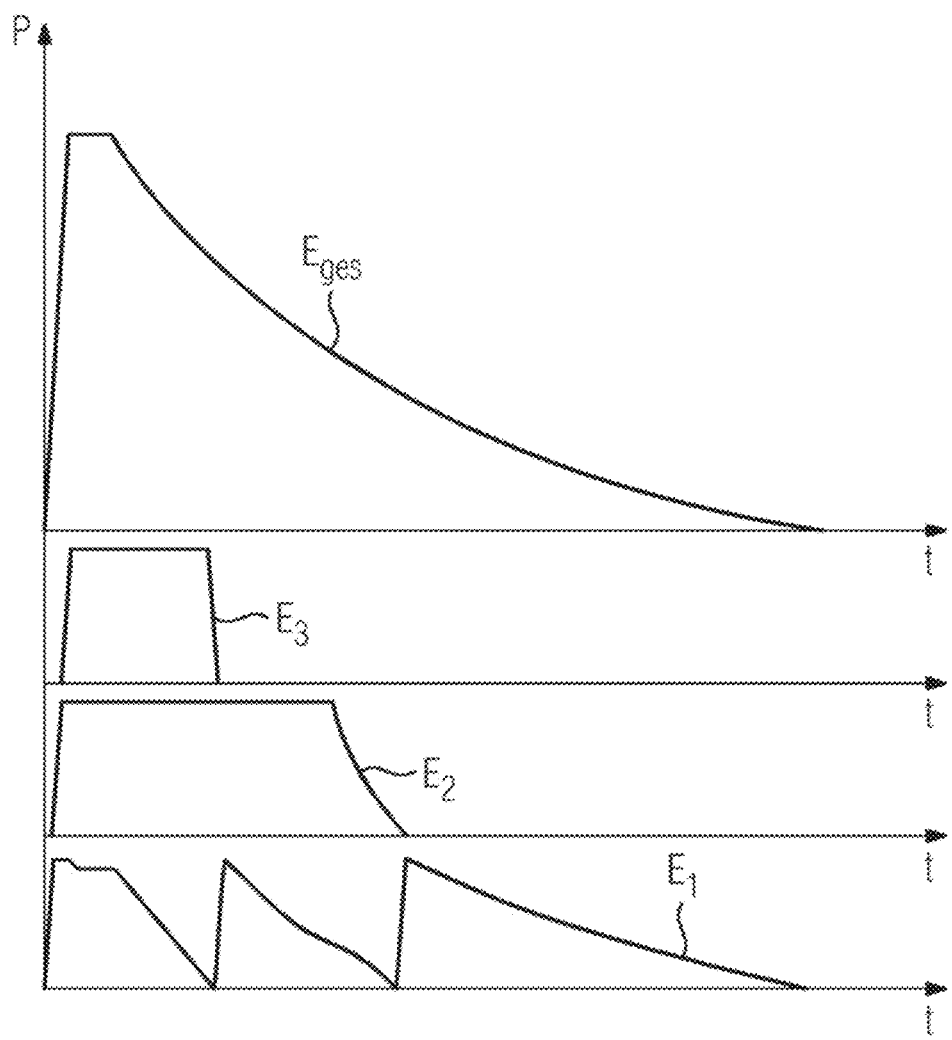
FIG. 2 depicts respective amounts of energy provided with the respective rectifier branches and a total amount of energy according to an embodiment.

FIG. 2 shows an example of respective amounts of energy $E_1$, $E_2$, $E_3$, which are provided with three rectifier branches 3a, 3b, 3c, as a function of the time t. In the present graph, the time t is plotted on the abscissa and the power P is plotted on the ordinate, in each case. The amount of energy $E_1$ is provided by the first rectifier branch 3a, the amount of energy $E_2$ is provided by the second rectifier branch 3b and the amount of energy $E_3$ is provided by the third rectifier branch 3c. A total amount of energy $E_{ges}$ is also. The total requirement or the total amount of energy $E_{ges}$ may be determined with the aid of a charging procedure controller of the charging station 1 and may be used to determine a load distribution for the respective rectifier branches 3a, 3b, 3c.

Figure 3:
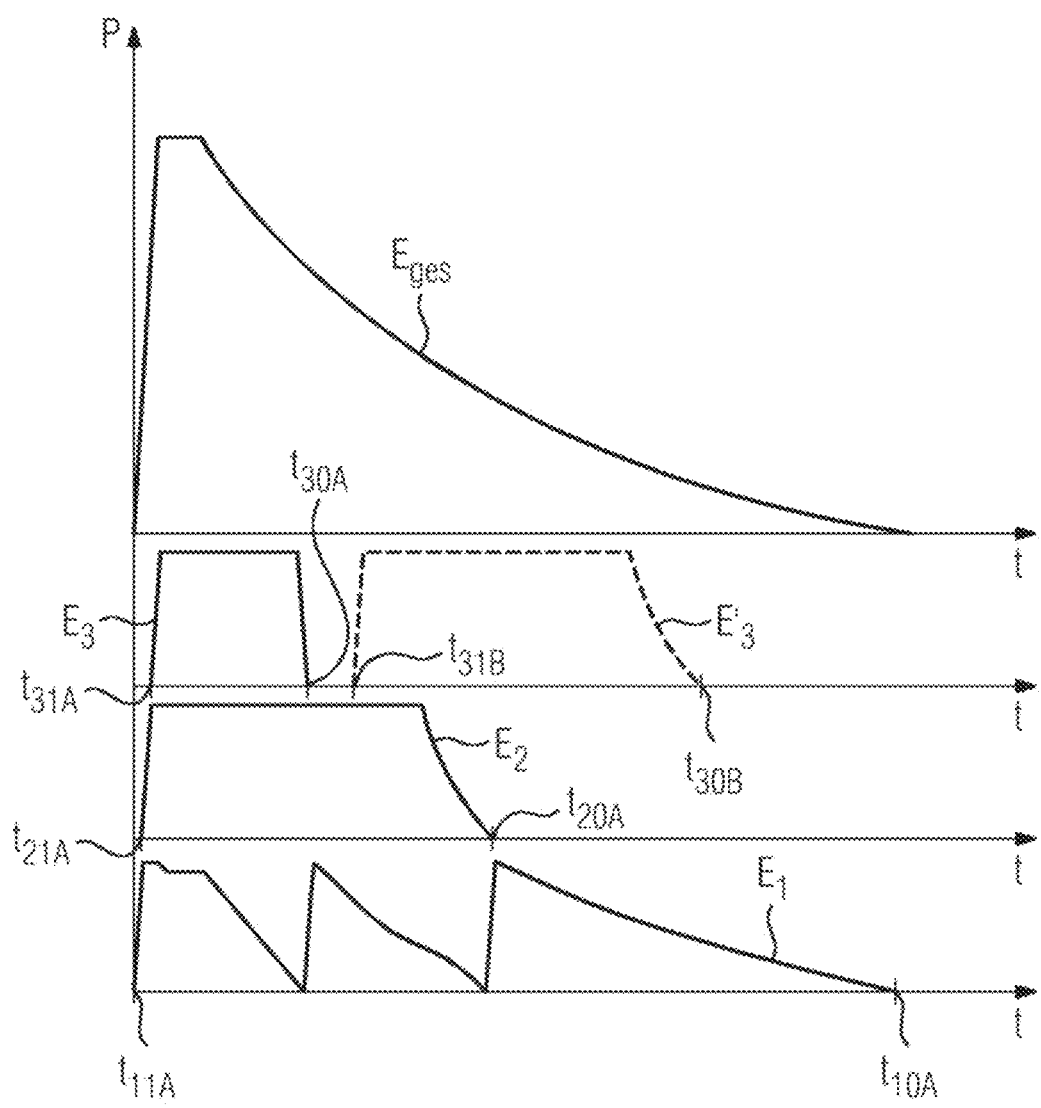
FIG. 3 depicts an example of amounts of energy provided with the respective rectifier branches according to a further embodiment.

FIG. 3 shows the graph according to FIG. 2 according to a further embodiment. During operation of the charging station 1, provision is made for the respective meters from the energy meters 5 to be captured by the at least one measured value capture computer 8. Corresponding times between which the energy is provided with the rectifier branches 3a, 3b, 3c may also be stored. In this example, provision is also made for a vehicle identification which describes the electric vehicle to be received using the at least one measured value capture computer 8 when the electric vehicle is connected to one of the charging points 2a, 2b. Billing may then be carried out based on the amount of energy removed at the charging point 2a, 2b and the vehicle identification. A change of an electric vehicle at one of the charging points 2a, 2b may be detected with the aid of the at least one measured value capture computer 8. In the present example, the amount of energy $E_3$ output to a first electric vehicle by the rectifier branch 3c describes is shown. After the change at the charging point 2a, 2b assigned to the rectifier branch 3c, the amount of energy $E_3'$ is output to a further electric vehicle.

Figure 4:
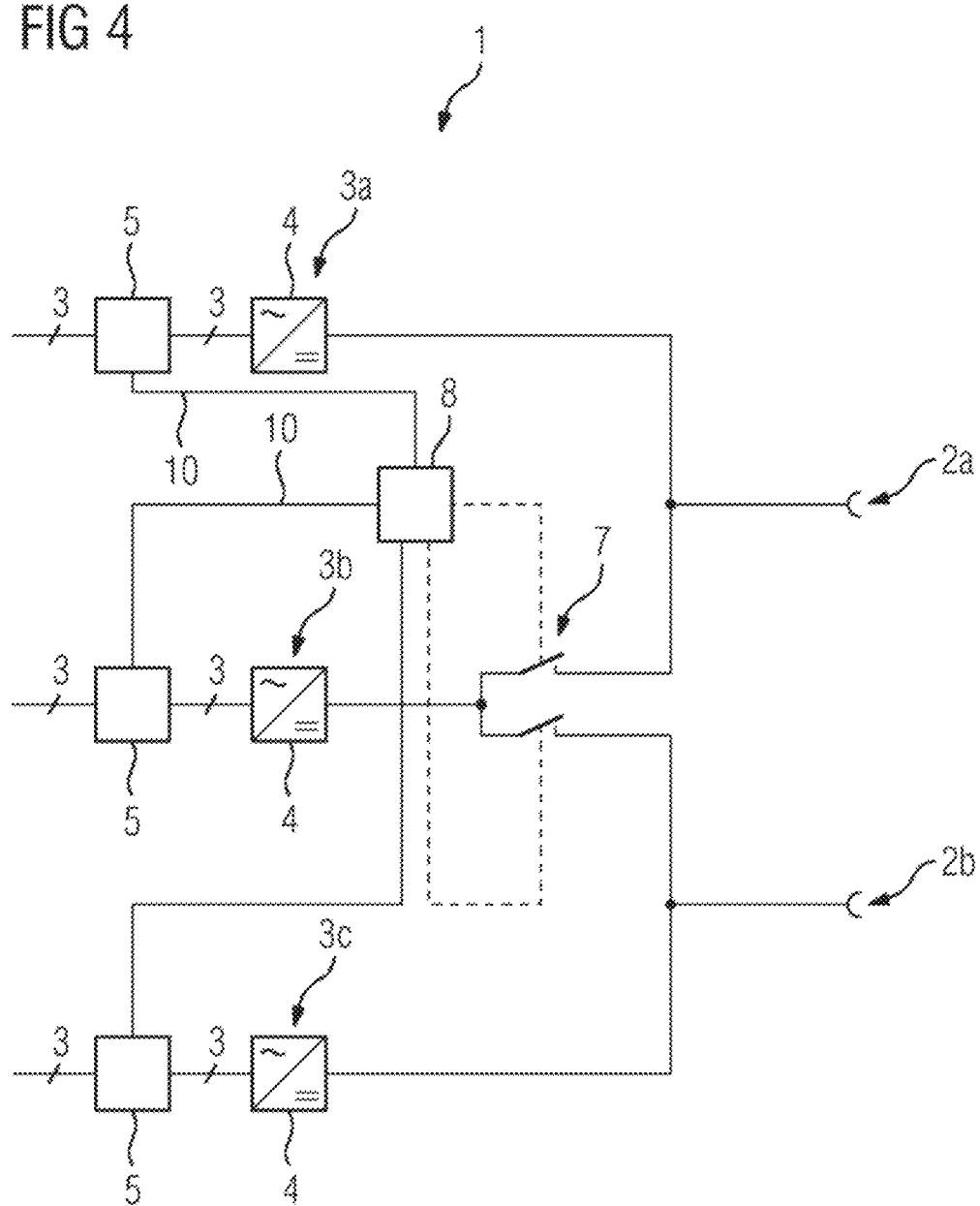
FIG. 4 depicts a schematic illustration of a charging apparatus according to a further embodiment.

FIG. 4 shows a schematic illustration of a charging station 1 according to a further embodiment. This charging station 1 also includes two charging points 2a and 2b. The charging station also includes three rectifier branches 3a, 3b and 3c. An energy meter 5 is respectively assigned to the respective rectifier branches 3a, 3b, 3c. In the present example, the charging station 1 includes only a single measured value capture computer 8. The latter is connected to the energy meters 5 via an analog data line 10. This charging station 1 also includes corresponding switching devices 7 for switching the electrical connecting lines 6 between rectifier branches 3a, 3b, 3c and the charging points 2a, 2b. In the present example, the measured value capture computer 8 may also receive switching information describing a current switching position of the respective switching devices 7. Information describing which of the rectifier branches 3a, 3b, 3c are connected to which of the charging points 2a, 2b may therefore be received using the measured value capture device 8. In addition, the amount of energy respectively output at the charging points 2a, 2b may be determined using the measured value capture device 8 on the basis of the meter values received from the respective energy meters 5. In this example, provision is made, in particular, for the measured value capture device 8 to receive meter values via the analog data line 10. An analog summing element for summing the meter values may then be provided in the measured value capture device 8.

Figure 5:
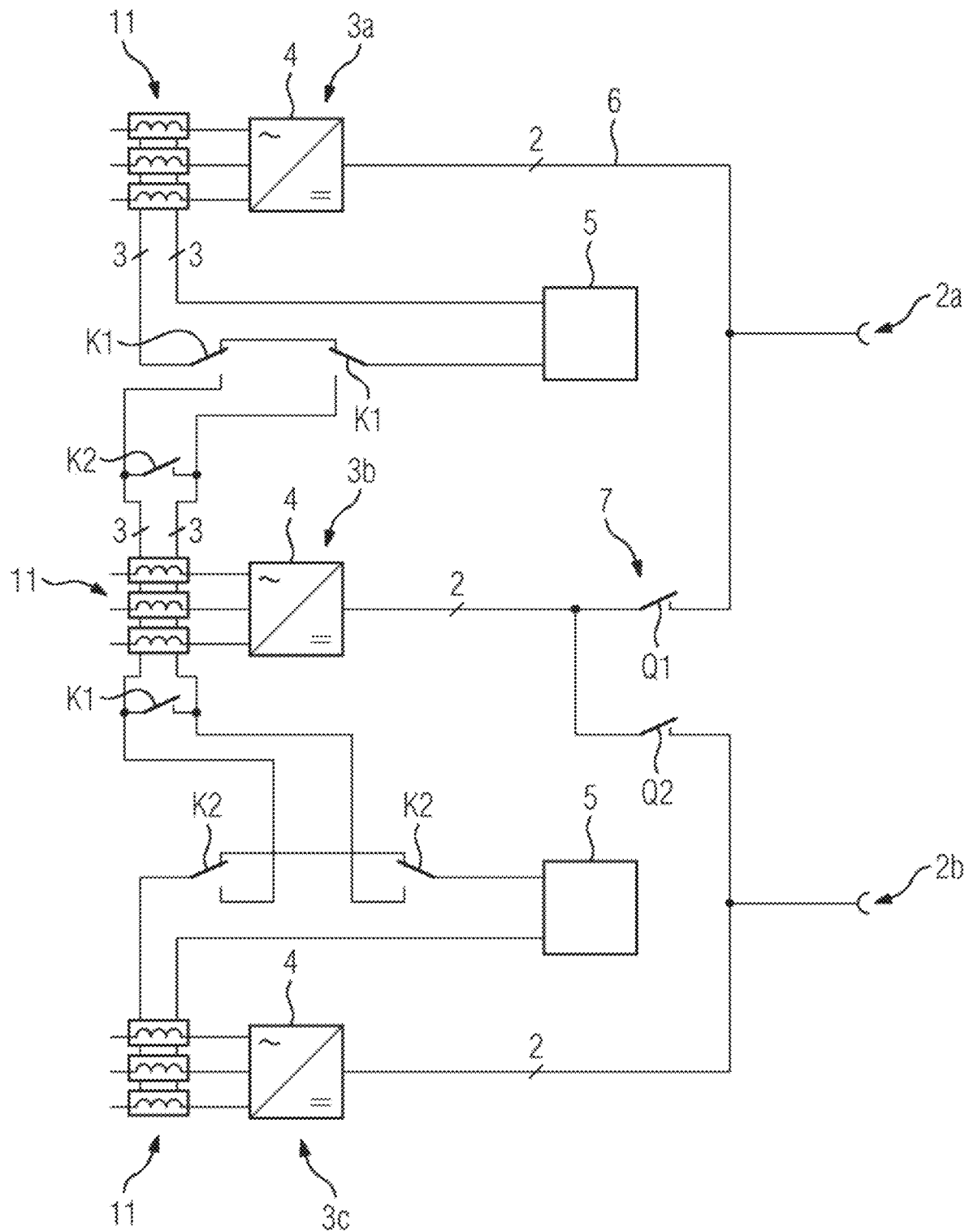
FIG. 5 depicts a schematic illustration of a charging apparatus according to a further embodiment.

FIG. 5 shows a schematic illustration of a charging station 1 according to a further embodiment. In this example, the charging station 1 includes two charging points 2a, 2b. Three rectifier branches 3a, 3b, 3c are also provided. In this example, a measuring transducer 11 is assigned to each of the rectifier branches 3a, 3b, 3c. The respective measuring transducers 11 may be used to determine an electrical voltage and/or an electrical current supplied to the respective rectifier branches 3a, 3b, 3c from the power supply network. The charging station 1 also includes an energy meter 5 for each of the charging points 2a, 2b. In this example, a switching device 7 is provided for the purpose of switching the electrical connecting lines 6. In the present example, the switching device 7 includes the switches Q1 and Q2. The respective measuring transducers 11 are connected in series and to the energy meters 5 via corresponding switches K1 and K2. If the switch Q1 is closed, the switches K1 are also closed. If, in the other situation, the switch Q2 is closed, the switches K2 are also closed. If the switch Q1 is closed, the first rectifier branch 3a and the second rectifier branch 3b are connected to the first charging point 2a. The measuring transducer 11 of the rectifier branch 3a is electrically connected to the measuring transducer 11 of the rectifier branch 3b by closing the switches K1. Furthermore, these two measuring transducers 11 are electrically connected to the energy meter 5 of the charging point 2a. In this manner, the amount of energy output at the first charging point 2a may be precisely determined with the aid of the energy meter 5 assigned to this charging point 2a.

The changeover of the rectifier branches 3a, 3b, 3c may be coupled to the capture of the amount of energy with the aid of the charging station 1. In this example, this mechanism is configured such that unnoticed manipulation may be excluded. Capture of the amount of energy delivered is provided by the charging stations 1 in a manner which makes it possible to uniquely assigning meter values to an electric vehicle if the rectifier branches 3a, 3b, 3c are dynamically assigned. The respective energy meters 5 are commercially available measuring devices which may be calibrated. The amount of energy is respectively captured in this case by additional hardware components. The capture of the respective amount of energy at the charging points 2a, 2b may therefore be carried out reliably and may be accordingly easily understood. The charging station also makes it possible to improve the utilization of the system and to accordingly reduce the investment costs and the space requirement.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A charging station for charging electric vehicles, the charging station comprising:
   at least two charging points, wherein each charging point is configured to be connected to an electric vehicle for charging an electrical energy store of the electric vehicle;
   at least two rectifier branches, wherein each rectifier branch is configured to provide electrical energy, wherein the at least two rectifier branches are configured to be electrically connected to the at least two charging points and an electrical connection is configured to be changed over between at least one of the rectifier branches and the at least two charging points;
   at least one energy meter configured to provide meter values which describe the electrical energy provided with the rectifier branches; and
   at least one measured value capture computer configured to determine, for each charging point of the at least two charging points, an amount of energy of the electrical energy provided with the rectifier branches electrically connected to the respective charging point based on the meter values from the at least one energy meter,
   wherein the at least one measured value capture computer is configured to capture a changeover of the electrical connection between a rectifier branch and the at least two charging points, and
   wherein the at least one measured value capture computer is configured to capture instantaneous meter values from the at least one energy meter each time the rectifier branch is changed over and to assign differences between the meter values to a vehicle identification of the electric vehicle.

2. The charging station of claim 1, wherein the at least one measured value capture computer is configured to determine the vehicle identification of the electric vehicle during the charging of the electrical energy store of the electric vehicle and to determine the amount of energy provided at the respective charging point during the charging of the electrical energy store.

3. The charging station of claim 1, further comprising:
   a charging procedure control unit for determining an electrical power required at the at least two charging points and for controlling the connection between the at least two rectifier branches and the at least two charging points based on the required power.

4. The charging station of claim 3, further comprising:
   an energy meter for each rectifier branch of the at least two rectifier branches,
   wherein the meter values provided with the respective energy meters describe the electrical energy from the energy meter assigned to the rectifier branch.

5. The charging station of claim 3, further comprising:
   a measuring transducer for each rectifier branch of the at least two rectifier branches for providing a measured value which describes the electrical energy,
   wherein an energy meter is assigned to each charging point of the at least two charging points,
   wherein the measuring transducers are connected to the energy meters based on the connection of the rectifier branches to the at least two charging points, and
   wherein the respective energy meters are configured to determine the meter values based on the measured values.

6. The charging station of claim 1, further comprising:
   an energy meter for each rectifier branch of the at least two rectifier branches,
   wherein the meter values provided with the respective energy meters describe the electrical energy from the energy meter assigned to the rectifier branch.

7. The charging station of claim 6, wherein the at least one measured value capture computer comprises a measured value capture computer for each charging point of the at least two charging points,
   wherein the measured value capture computers are connected to the respective energy meters via a data bus, and
   wherein the charging station has a plurality of switching devices for switching the electrical connection between the respective rectifier branches and the at least two charging points and for switching a connection of the data bus.

8. The charging station of claim 6, wherein the at least one measured value capture computer is connected to the respective energy meters for transmitting data,
   wherein the charging station has a plurality of switching devices for switching the electrical connection between the respective rectifier branches and the at least two charging points, and
   wherein the at least one measured value capture computer is configured to capture a respective position of the switching devices.

9. The charging station of claim 8, wherein the at least one measured value capture computer has an analog interface via which the at least one measured value capture computer is connected to the respective energy meters, and
   wherein the at least one measured value capture computer has a summing element for summing the meter values.

10. The charging station of claim 1, further comprising:
    a measuring transducer for each rectifier branch of the at least two rectifier branches for providing a measured value which describes the electrical energy,
    wherein an energy meter is assigned to each charging point of the at least two charging points, wherein the measuring transducers are connected to the energy meters based on the connection of the rectifier branches to the at least two charging points, and wherein the respective energy meters are configured to determine the meter values based on the measured values.

11. The charging station of claim 1, wherein the at least one energy meter is configured to capture an electrical voltage and/or an electrical current supplied to a rectifier branch of the at least two rectifier branches.

12. The charging station of claim 1, wherein the at least one energy meter is configured to capture an electrical voltage and/or an electrical current output by the at least two rectifier branches.

13. The charging station of claim 2, further comprising:
a charging procedure control unit for determining an electrical power required at the at least two charging points and for controlling the connection between the at least two rectifier branches and the at least two charging points based on the required power.

14. The charging station of claim 13, further comprising:
an energy meter for each rectifier branch of the at least two rectifier branches,
wherein the meter values provided with the respective energy meters describe the electrical energy from the energy meter assigned to the rectifier branch.

15. The charging station of claim 13, further comprising:
a measuring transducer for each rectifier branch of the at least two rectifier branches for providing a measured value which describes the electrical energy,
wherein an energy meter is assigned to each charging point of the at least two charging points,
wherein the measuring transducers are connected to the energy meters based on the connection of the rectifier branches to the at least two charging points, and
wherein the respective energy meters are configured to determine the meter values based on the measured values.

16. A method for operating a charging station for charging electric vehicles, the method comprising:
connecting an electric vehicle to a charging point of at least two charging points for charging an electrical energy store of the electric vehicle;
providing electrical energy with at least two rectifier branches, wherein the at least two rectifier branches are configured to be electrically connected to the at least two charging points and an electrical connection is configured to be changed over between at least one rectifier branch of the at least two rectifier branches and the at least two charging points;
providing meter values using at least one energy meter, wherein the meter values describe the electrical energy provided with the at least two rectifier branches; and
determining, for each charging point of the at least two charging points, an amount of energy of the electrical energy provided with the rectifier branches electrically connected to the respective charging point based on the meter values from the at least one energy meter using at least one measured value capture computer;
capturing a changeover of the connection between the at least one rectifier branch and the at least two charging points using the at least one measured value capture computer;
capturing instantaneous meter values from the at least one energy meter using the at least one measured value capture computer each time the at least one rectifier branch is changed over; and
assigning differences between the meter values to a vehicle identification of the electric vehicle.

* * * * *